July 30, 1935.   J. D. BRADY   2,009,646
COMBINATION HIGH PRESSURE SEPARATOR AND DEHYDRATOR
Filed April 19, 1932   3 Sheets-Sheet 1
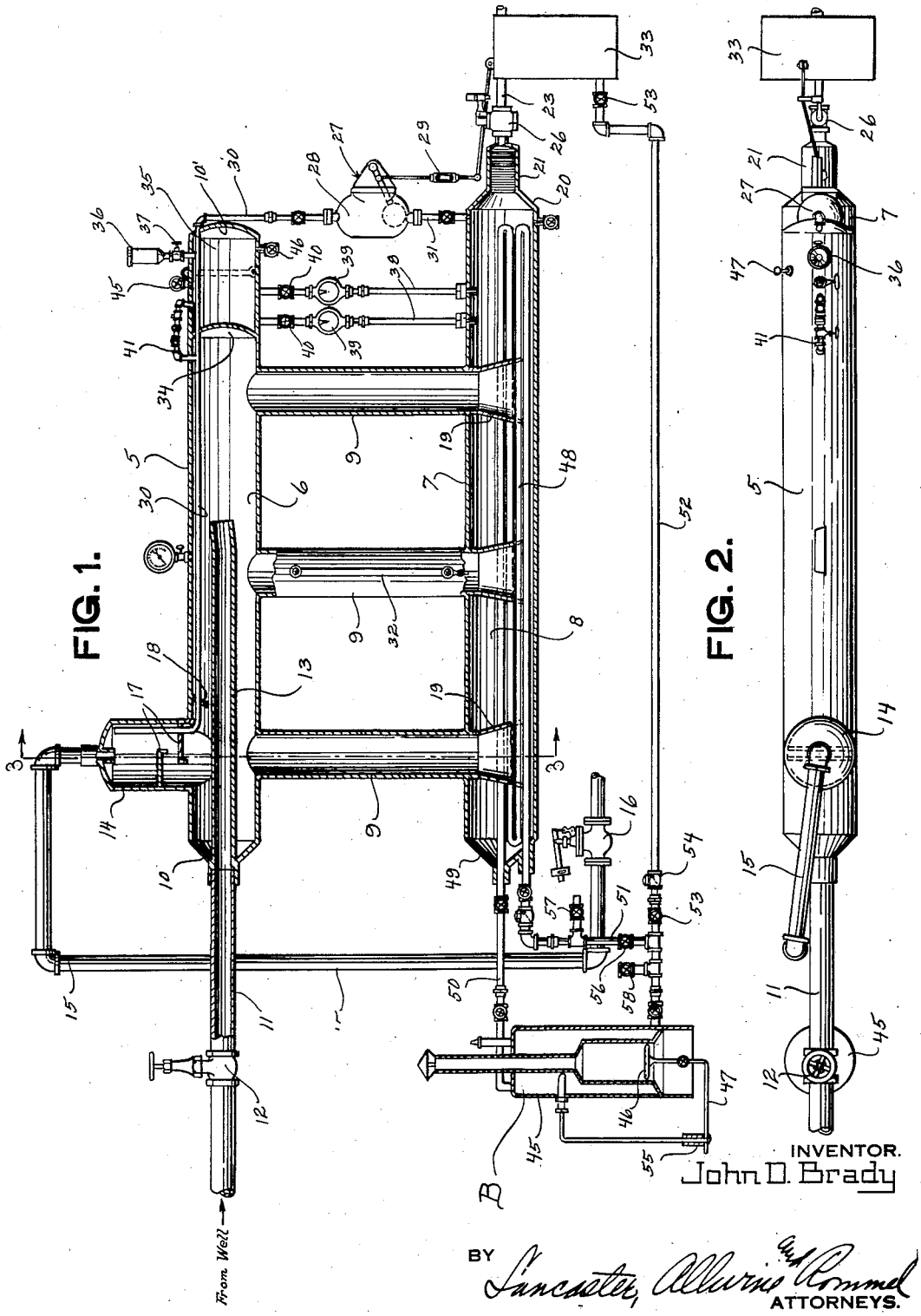
INVENTOR.
John D. Brady
BY
ATTORNEYS.

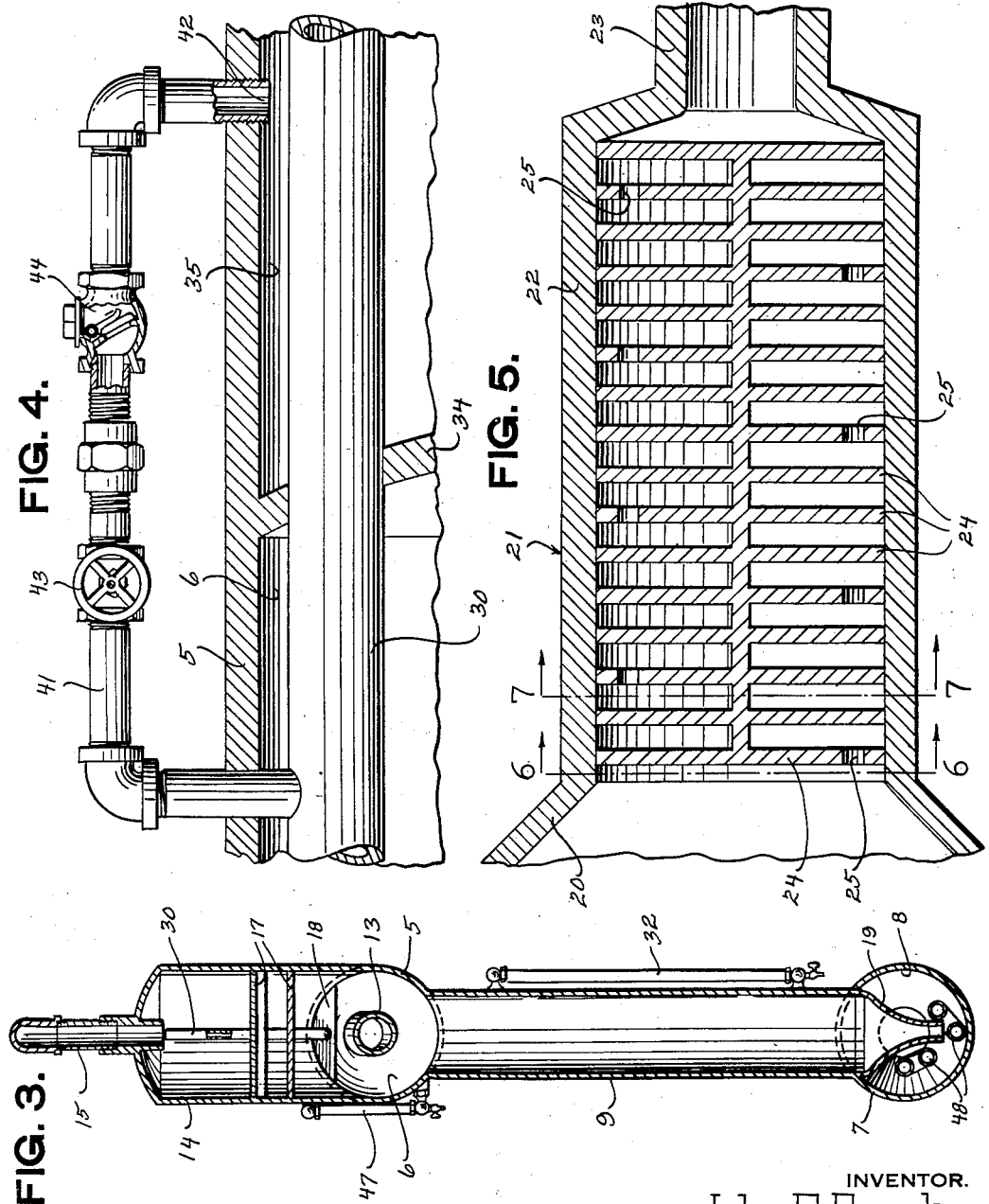

July 30, 1935.    J. D. BRADY    2,009,646
COMBINATION HIGH PRESSURE SEPARATOR AND DEHYDRATOR
Filed April 19, 1932    3 Sheets-Sheet 3
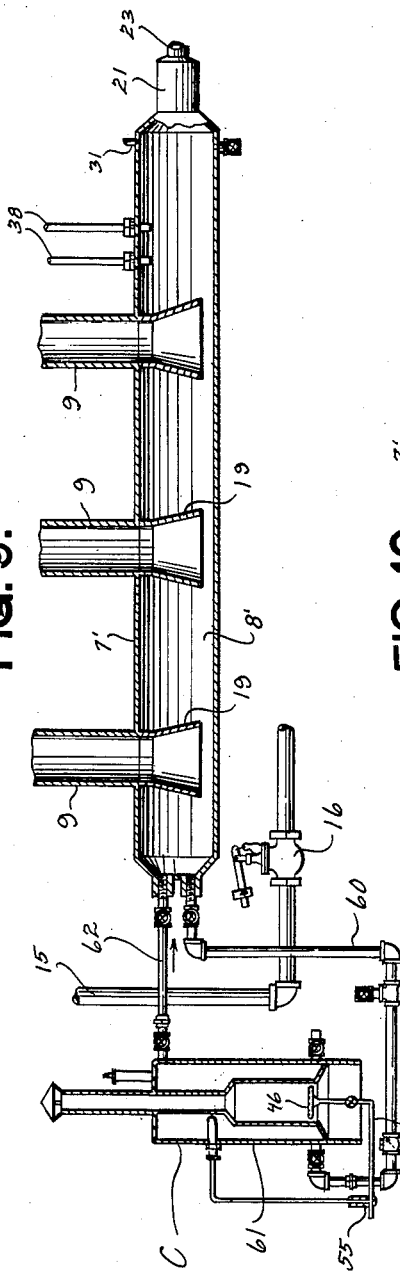
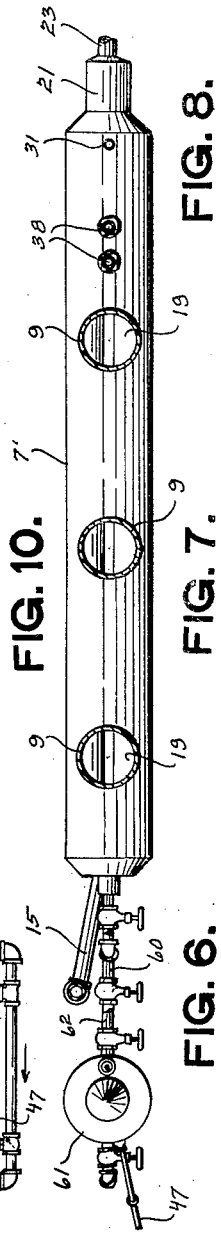
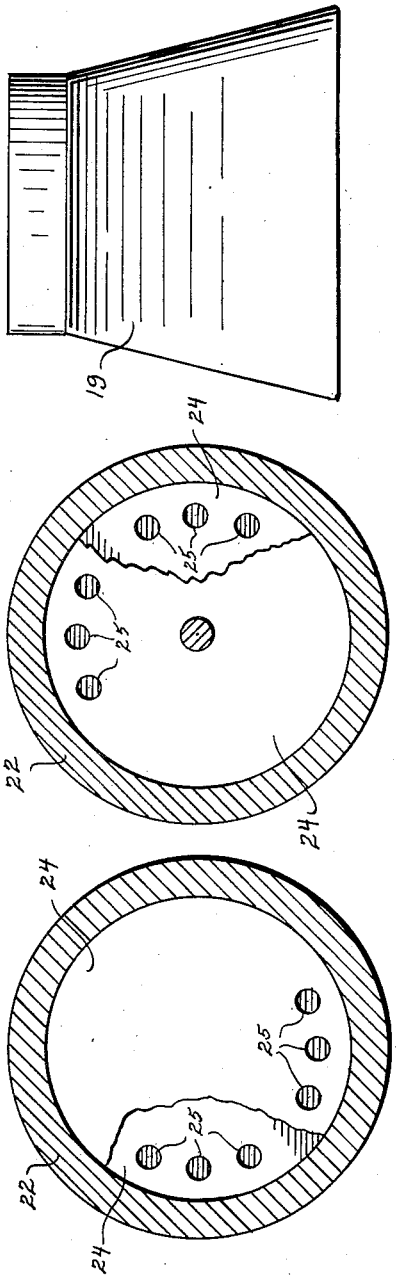
INVENTOR.
John D. Brady Patented July 30, 1935

2,009,646

UNITED STATES PATENT OFFICE 2,009,646

COMBINATION HIGH PRESSURE SEPARATOR AND DEHYDRATOR

John D. Brady, McPherson, Kans.; Ruby Brady administratrix of said John D. Brady, deceased Application April 19, 1932, Serial No. 606,257

8 Claims. (Cl. 196—5)

The present invention relates to a combination high pressure separator and dehydrator for the treatment of petroleum emulsions.

With the present forms of apparatus for treating petroleum emulsions in oil fields, a chemical lubricator is installed on the flow line for feeding the treating chemical into the emulsion prior to passage into the separator. To prevent over production of oil, proration and holding the wells to a given per cent of their potential, has necessitated the placing of a choke or flow bean in the flow line to hold the well back and control production of the well. The wells produce along with the oil, a considerable amount of gas and when "choked in" maintain a high pressure on the well side or inlet of the choke, whereas on the outlet side of the choke it is only necessary to maintain a low pressure sufficient to force the oil thru some form of heater or separator into storage tanks. This difference in pressure causes the emulsion to pass thru the small aperture in the choke or flow bean at a very high velocity thereby increasing the viscosity of the emulsion due to the violent agitation created by the Venturi effect of the flow bean. This violent agitation produces a product of such high viscosity that it is almost impossible to treat this emulsion even with large quantities of chemical. The higher the viscosity of the emulsion, the harder the emulsion will be to treat chemically or otherwise, the more chemical will be required to resolve the emulsion, and the greater will be the cost per barrel. It is therefore a primary object of the present invention to provide apparatus for the treating of petroleum emulsions, having means for controlling the amount of oil emitted from the well without increasing the viscosity of the emulsion.

A further object of the invention is to provide a combination high pressure separator and dehydrator wherein agitation of the emulsion is prevented, thereby resulting in a product of extremely low viscosity capable of being easily and economically treated with a small amount of chemical.

A further object resides in the arrangement whereby the amount of oil emitted from the well is governed by controlling the escape of gas from the separator and dehydrator.

A further object is to provide apparatus of this character wherein the chemical is applied to the oil after being separated from the gas, thereby preventing the gas from carrying off a large portion of the chemical from which no benefit is derived in treating of the emulsion.

A further object is to provide apparatus of this character wherein the treating chemical will be maintained at a more uniform temperature thus insuring even feeding of the chemical, and an arrangement whereby a saving in gas in flowing wells will be had with the result that the well will flow for a longer period of time before requiring pumping.

A further object resides in the heater means for the emulsion and the improved arrangement for obtaining water for the heater means.

A still further object resides in the improved means for thoroughly mixing the oil treating chemical with the emulsion.

Other objects and advantages of the invention will be apparent during the course of the following detailed description, taken in connection with the accompanying drawings forming a part of this specification and in which drawings:—

Figure 1 is a vertical sectional view taken longitudinally thru the apparatus.

Figure 2 is a top plan view of the apparatus.

Figure 3 is an enlarged vertical section on the line 3—3 of Figure 1.

Figure 4 is an enlarged fragmentary sectional view showing the arrangement for balancing pressure in the chamber of the chemical feeding means.

Figure 5 is an enlarged longitudinal section thru the agitator.

Figures 6 and 7 are sectional views on the respective lines in Figure 5.

Figure 8 is an enlarged side elevation of one of the flumes extending into the lower or oil chamber of the apparatus.

Figure 9 is a fragmentary longitudinal section of the lower portion of the separator and showing a modified form of heater means for the apparatus.

Figure 10 is a top plan view of the showing in Figure 9.

Referring to the drawings in detail and wherein similar reference characters designate corresponding parts thruout the several views the apparatus comprises an upper horizontally disposed cylindrical tank 5 providing an elongated gas chamber 6, and a lower horizontally disposed cylindrical tank 7 providing an elongated oil chamber 8 arranged parallel to and directly beneath the tank 5. Connecting the lower side of the tank 5 with the upper side of the tank 7 is a series of vertically disposed conductor pipes 9 forming communication between the tanks. The tanks 5 and 7 are of substantially equal size and the conductor pipes 9 may be of any desired number.

Opening thru the end wall 10 of the upper tank 5 is a conduit 11 providing an inlet for the emulsified oil and this inlet or flow line 11 is provided with a control valve 12, preferably a gate valve serving to control flow of the emulsified oil and gas into the apparatus. Communicating with the inlet line 11 and extending axially into the tank 5 for about one-half of the length of the tank is an inlet tube or nozzle 13 preferably having its inner end directed upwardly at a slight angle as clearly shown in Figure 1. Thus the tube or nozzle 13 serves to deliver the emulsified oil into the chamber 6 at a point substantially midway the ends of the chamber and in a direction toward the rear end wall 10' of the tank 5. The nozzle or tube 13 is preferably of a diameter equal to the diameter of the inlet conduit 11 so that the nozzle does not restrict flow of the emulsion into the chamber 6.

Extending upwardly from the forward end portion of the tank 5 is a gas dome 14 to the upper end of which is connected a gas exit conduit 15 which may lead to any suitable storage tank. Provided in the gas conduit 15 is a gas outlet control valve 16 of the semi-balanced type and the function of this valve 16 will be subsequently described. Arranged within the dome 14 are vertically spaced apart baffle plates 17 which preferably overlap along their downturned free edges as shown in Figure 1. Arranged in the upper portion of the tank 5 just rearwardly of the dome 14 is an annularly disposed deflector 18 which terminates at its lower edge above the nozzle 13 and serves to deflect the gas downwardly in its travel to the dome 14 for escape thru the conduit 15. The oil and gas with its emulsion content is fed thru the nozzle 13 and expanded into the large chamber 6, the gas rising into the dome 14 and carried away thru the conduit 15 while the emulsified oil settles into the lower chamber 8 thru the vertical conductor pipes 9.

Connected to the lower end of each of the vertical conductor pipes or stand tubes 9 is a nozzle-like extension 19, one of which is shown in detail in Figure 8. These extensions 19 have their lower portions flat to extend in a direction longitudinally of the tank 7 and have their lower ends opening into the chamber 8 at a point relatively close to the bottom side of the chamber as shown in Figure 3. Thus the oil and water settling thru the pipes 9 is delivered into the lower portion of the chamber 8.

Connected with the rear end wall 20 of the lower oil tank 7 is an agitator 21 embodying a tubular shell 22 provided at its rear end with an oil outlet conduit 23. Arranged within the tubular shell 22 is a series of spaced apart baffle plates 24 each of which is provided adjacent its peripheral edge with a series of apertures 25 arranged on an arc concentric to the axis of the baffles. Referring particularly to Figures 6 and 7 it will be noted that the series of apertures 25 in the baffles 24 are arranged 90° apart from the next adjacent baffle so that the oil when passing thru the agitator is caused to travel in a spiral path by reason of the arrangement of the apertures 25. The baffle plates 24 and arrangement of apertures 25 creates a centrifugal action upon the emulsion throwing the heavier particles such as water toward the shell 22 so that the agitator aside from functioning in the manner of a centrifugal separator also serves to thoroughly mix the treating chemical with the emulsion when such is required.

Connected in the oil outlet conduit 23 is a balanced oil outlet valve 26 adapted to be automatically controlled by the high pressure float control 27. The high pressure float control 27 is of conventional construction including the float box 28 and lever means 29 suitably connected to the outlet valve 26. The balance line 30 for the float control 27 is extended thru the rear end wall 10' of the upper tank 5 and terminates in the upper portion of the dome 14 whereby dry gas will enter the balance line for equalizing pressure in the float box 28. The lower end of the float box 28 is connected by a pipe 31 to the rear end portion of the tank 7 whereby oil may enter the float box for operating the float and actuating the valve 26 when the oil has reached a predetermined level in the conductor pipes 9. The conductor pipes 9 aside from forming communication between the chambers 6 and 8 also form storage space for the oil and one of the conductor pipes is preferably provided with a liquid level tube 32. Thus, the high pressure float control device 27 maintains the oil at a predetermined level in the apparatus by its actuation of the oil outlet valve 26.

The oil delivered thru the oil outlet conduit 23 may either be conveyed directly to storage tanks or delivered into a settling tube or tank 33 where the water and oil are separated by a settling process prior to delivery of the oil into the storage tank.

A chemical treating means for the emulsion is embodied in the apparatus and is so arranged as to deliver the treating chemical directly into the emulsion after separation of the gas. Secured in the upper tank 5 between the rearmost vertical conductor pipe 9 and the rear end wall 10' is a head plate 34 providing a chemical chamber 35 at the rear end portion of the tank 5. The chemical chamber 35 is provided with a filling funnel 36 having a shut-off valve 37 to be closed after the chemical is placed in the chamber 35. Connected between the lower portion of the chemical chamber 35 and the upper rear portion of the lower oil tank 7 are gravity feed pipes 38 each of which is provided with a sight feed 39 and a control valve 40 for regulating feeding of the treating chemical.

Referring particularly to Figure 4, a branch balance line 41 is connected in the balance line 30 preferably just forwardly of the head plate 34 and extends upwardly thru the tank 5 and along the upper side thereof with its opposite end opening into the top of the chemical chamber 35 as at 42. This branch balance line 41 delivers dry gas into the chamber 35 for equalizing the pressure in the chamber 35 whereby the chemical may have a gravity feed thru the sight feeds 39. The branch balance line 41 is provided with a gate valve 43 and a check valve 44 disposed in the line between the valve 43 and outlet end 42. The chemical chamber 35 is provided with a relief valve 45 and a drain valve 46, and a fluid level glass 47 is also provided for determining the quantity of chemical in the chamber 35. When filling the chamber 35 with the treating chemical, the valves 40 and 43 are first closed and then the valves 37 and 45 opened. In this condition, the chemical may be poured into the funnel 36 and the valve 45 will serve as a relief valve permitting escape of gas from the chamber 35 during the filling operation. The check valve 44 serves as a safety valve to prevent passage of the chemical into the main balance line 30 should too much of the chemical be placed in the chemical chamber so as to rise in the branch balance line 41. After filling the chamber 35 the valves 37 and 45 are closed and the valves 40 and 43 opened to equalize pressure in the chamber 35. Thus it will be seen that the chemical lubricating means feed the treating chemical by gravity into the emulsion contained in and passing thru the chamber 8. With this arrangement for feeding the treating chemical into the emulsion after separation of the gas, the full benefit of the chemical is obtained since the gas is not permitted to carry off a portion of the chemical and from which no benefit is derived in treating the emulsion.

Referring particularly to Figures 1, 2 and 3, a heating means B is provided for applying heat to the emulsions contained in the oil chamber 8. The heating means B comprises a heater 45 preferably provided with a gas burner 46 supplied by a gas supply line 47. Arranged within the lower tank 7 and extending longitudinally thereof is a heating coil 48 which opens thru the front end wall 49 of the tank. One end of the heating coil 48 is connected by a supply pipe 50 with the upper portion of the boiler of the heater 45 for conducting either steam or hot water from the heater to the heating coil. Connected with the opposite end of the heating coil 48 is a return pipe 51 which connects with the lower portion of the boiler of the heater. Connected in the return pipe 51 is a water supply line 52 which connects with the lower portion of the settling tube 33 to furnish a supply of water for the heating means. The supply of water in the lower portion of the settling tube 33 is the water which is separated from the emulsion and permitted to settle in the settling tube. The supply line 52 may be provided with suitable gate valves 53 for controlling supply of water to the heater and a check valve 54. If the heating means is to be operated under the thermosiphon principle, the valves 53 are normally closed and the temperature of the water is regulated by a suitable thermostatic valve 55 provided in the gas supply line 47. The heat generated in the coil 48 by the heater 45 will subject the emulsion in the oil heating apparatus to a heating treatment causing the water of the emulsion to seek the lower level incident to gravity and the oil to seek the upper level. If it is desired to have a forced circulation of the hot water thru the coil 48, the valve 56 is closed and the valves 53 opened. The waste valve 57 connected in the return pipe 51 is then partly opened whereby pressure in the settling tube 33 will force the water thru the supply pipe 52 into the bottom of the heater boiler, then thru the heating coil 48 and to the waste valve 57 which thru being opened various degrees will regulate the flow of water thru the heating coil. The object in having the nozzle-like extensions 19 flat in a direction longitudinally of the lower tank 7 is to permit placing of the heating coil 48 and by extending the nozzles to a point adjacent the lower side of the chamber 8 causes the emulsion coming down thru the conductor pipes 9 to pass upwardly about the coils and also the hot water settled in the chamber 8.

When a fresh water supply is available, the water supply line 52 may be dispensed with and a fresh water supply line connected into the return pipe 51 thru the valve 58.

Referring now to the form of heating means C shown in Figures 9 and 10, the simple thermosiphon heating method is used, the water being taken from the bottom of the oil or emulsion chamber 8' and passed thru the return pipe 60 into the boiler of the heater 61 and then returned to the upper portion of the chamber 8' thru the pipe 62. The thermosiphon method shown in Figures 9 and 10 is intended for use on wells that do not have in excess of 150 or 200 pounds pressure.

Referring particularly to Figure 1, and to the manner of operation of the apparatus, with the gate valve 12 fully open, the same pressure that is in the well will also be in the separator and dehydrator. That is, if a pressure of 700 pounds is on the well, a pressure of 700 pounds will also be on the separator. The emulsified petroleum entering the inlet tube 13 will have a rapid expansion into the chamber 6 which causes a separation of the gas from the emulsion. The gas rises in the dome 14 and its escape is regulated by the semi-balanced gas escape control valve 16. Thus the gas is separated from the oil, water or emulsion in the upper chamber 6 and without any violent agitation of the emulsion such as would increase the viscosity of the emulsion and render the emulsion harder to treat chemically. The emulsion settles thru the conductor pipes 9 to the lower chamber 8 where the water and oil separate by a settling process and after the liquid level has reached a given height in the tubes 9 the float control 27 opens the oil escape valve 26 permitting escape of the oil and water from the apparatus for delivery thru the pipe 23 either into the settling tube 33 or to suitable heat treating plants when a heating means such as B is not incorporated in the apparatus. The well is entirely controlled by either confining or permitting escape of gas from the separator and dehydrator by the semi-balanced gas escape control valve 16. This manner of governing the amount of oil emitted from the well by confining or releasing the gas at the separator, results in a material saving of the gas which means, in the case of flowing wells, that the wells will flow over a longer period of time before pumping equipment will be required. With this arrangement of controlling flow of the well it will be noted that waste of the gas is prevented since it is often the case that a well does not flow in unbroken stream of oil, but will flow for a period making both oil and gas, and then start making gas only until the column of oil in the well has built up to a sufficient height so that the gas can force the oil out. During the time that the well is making only gas, the pressure on the well will gradually fall and during this period the semi-balanced gas escape control valve 16 will remain closed and prevent escape of the gas until the pressure has risen to the pressure for which the valve 16 is set and at which time oil will be delivered into the separator and dehydrator.

When the emulsified petroleum is of a nature requiring chemical treatment, the chemical treating means functions to deliver the chemical directly to the oil and emulsion in the lower chamber 8 after the gas has been separated in the upper chamber 6. The emulsion after having the treating chemical applied is passed thru the agitator 21 which thoroughly mixes the chemical with the emulsion and thru the centrifugal action of the separator, separates the heavier particles such as water from the emulsion. The emulsion is delivered into the settling tubes 33 where the water readily settles out of the oil which is delivered under a reduced pressure to suitable storage tanks. The emulsified petroleum is delivered thru the nozzle 13 against the head plate 34 so that the chemical in the chamber 35 is retained at an even temperature to insure uniform feeding of the chemical.

Thus it will be seen that improved apparatus for the treatment of petroleum emulsions has been provided wherein the flow of the well is entirely controlled by simply confining or releasing the gas at the separator, and apparatus wherein there are no small apertures such as flow beans thru which the petroleum emulsion passes at high velocity to produce an emulsion of high viscosity which will require a considerable amount of chemical for treatment of the emulsion. It will also be apparent that an arrangement has been provided wherein the treating chemicals when required are applied to the emulsion after the gas has been removed and thereby preventing the gas from carrying off a large percentage of the chemical which is of no benefit in treating the emulsion.

While the apparatus has been described for connection with flowing wells it is to be understood that the emulsion may be equally well delivered to the inlet 11 by high pressure pumps from suitable storage tanks.

Changes in detail may be made to the forms of invention herein shown and described, without departing from the spirit of the invention or the scope of the following claims.

I claim:

1. In a high pressure separator for petroleum emulsions the combination of upper and lower horizontally disposed tanks, vertical conductor pipes forming communication between the tanks, means for delivering emulsified petroleum into the upper tank, an oil outlet for the lower tank, float valve operated means for controlling the oil outlet, means for heating the oil in the lower tank, a gas outlet conduit communicating with the top of the upper tank, and a gas escape control valve in the gas conduit for automatically controlling the amount of emulsion delivered into the upper tank.

2. In a high pressure separator for petroleum emulsions the combination of upper and lower horizontally disposed tanks, conduits forming communication between the tanks, an emulsion inlet for the upper tank, an agitator communicating with the lower tank, an oil outlet for the agitator, a control valve in the oil outlet, float actuated means for controlling the control valve, a gas outlet conduit communicating with the upper tank, and a pressure operated gas escape control valve in the gas outlet conduit for controlling the amount of emulsion entering the upper tank.

3. In a high pressure separator and dehydrator for petroleum emulsions the combination of upper and lower horizontally disposed tanks, vertical conductor pipes forming communication between the tanks, means for feeding emulsified petroleum longitudinally into the upper tank from the forward end thereof, a gas dome adjacent the forward end of the upper tank, a gas outlet conduit for the dome, a semi-balanced gas escape control valve for the gas outlet conduit, an oil outlet at the rear end of the lower tank, a control valve in the oil outlet, high pressure float controlled means for actuating the control valve upon a predetermined level of the oil in the conductor pipes, a chemical chamber at the rear end of the upper tank and having a wall against which the feeding petroleum is directed, pressure balancing means between the upper tank and chemical chamber, and gravity feed means between the chemical chamber and lower tank, and heating means for the lower tank.

4. In a high pressure separator and dehydrator for petroleum emulsions the combination of upper and lower horizontally disposed tanks, vertical conductor pipes forming communication between the tanks, means for feeding emulsified petroleum into the upper tank from the forward end thereof, a gas dome adjacent the forward end of the upper tank, a gas outlet conduit for the dome, a semi-balanced gas escape control valve for the gas outlet conduit, an oil outlet at the rear end of the lower tank, an agitator in the oil outlet, a control valve in the oil outlet beyond the agitator, high pressure float controlled means for actuating the control valve upon a predetermined level of the oil in the conductor pipes, a head plate secured in the upper tank and providing a chemical chamber at the rear end of the tank, pressure balancing means between the upper tank and chemical chamber, gravity feed means between the chemical chamber and lower tank, heating means for the lower tank, and extensions on the lower ends of the conductor pipes and extending to points closely adjacent the bottom of the lower tank.

5. In a high pressure separator and dehydrator for petroleum emulsions the combination of upper and lower horizontally disposed tanks, vertical conductor pipes forming communication between the tanks, an inlet tube extending longitudinally into the upper tank from the forward end thereof, means for delivering petroleum emulsion into the tube, an oil outlet conduit for the lower tank, an agitator in the oil outlet conduit, an oil escape control valve in the conduit beyond the agitator, a head plate in the upper tank rearwardly of the inlet tube and providing a chemical receiving chamber, pressure balancing means for the chemical chamber, chemical feeding means between the chemical chamber and lower tank, a gas dome for the upper tank and arranged forwardly of the outlet end of the inlet tube, pressure operated valve controlled means for controlling the amount of emulsion delivered into the upper tank, and heating means for the lower tank.

6. In a high pressure separator and dehydrator for petroleum emulsions the combination of upper and lower horizontally disposed tanks, vertical conductor pipes forming communication between the tanks, means for feeding emulsified petroleum into the upper tank, an oil outlet conduit for the lower tank, a float controlled valve in the oil outlet conduit for maintaining a liquid level in the conductor pipes, gas escape control means communicating with the upper tank, heating coils in the lower tank, high pressure chemical lubricator means for feeding chemical into the lower tank, and an extension on the lower end of each conductor pipe and opening adjacent the bottom of the lower tank.

7. In a high pressure separator and dehydrator for petroleum emulsions the combination of upper and lower tanks, conductor pipes forming communication between the tanks, means for feeding emulsified petroleum into the upper tank, a liquid outlet conduit for the lower tank, a float controlled valve in the liquid outlet conduit, gas escape control means communicating with the upper tank, a high pressure chemical lubricator means for feeding chemical into the top of the lower tank, a settling tube for receiving the liquid from the outlet conduit, heating means including a heating coil arranged in the lower tank, means for supplying water to the heating means from the settling tube, and an extension on the lower end of each conductor pipe for delivering the emulsified oil to the lower portion of the lower tank below said heating coil.

8. In apparatus for treating petroleum emulsions the combination of a separator embodying upper and lower tanks, conductor pipes forming communication between the tanks, an emulsion inlet tube extending longitudinally into the upper tank and permitting an unrestricted flow of emulsion into the tank, valve controlled oil outlet means for the lower tank, and gas escape control means for the upper tank for controlling the amount of emulsion delivered into the upper tank.

JOHN D. BRADY.